Feb. 1, 1944.   F. H. WELLS   2,340,354
BAKING METHOD
Filed June 6, 1941   4 Sheets-Sheet 1

INVENTOR
FRANKLIN H. WELLS
BY
ATTORNEY

Feb. 1, 1944. F. H. WELLS 2,340,354
BAKING METHOD
Filed June 6, 1941 4 Sheets-Sheet 4

INVENTOR
FRANKLIN H. WELLS
BY
ATTORNEY

Patented Feb. 1, 1944

2,340,354

UNITED STATES PATENT OFFICE 2,340,354

BAKING METHOD

Franklin H. Wells, Hackensack, N. J., assignor to American Machine & Foundry Company, a corporation of New Jersey Application June 6, 1941, Serial No. 396,836

2 Claims. (Cl. 107—54)

This invention relates to baking, more particularly to the art of baking bread and other bakery products, such as rolls, biscuits, etc. One of the main objects of the invention is to bake bread loaves with penetrating infra-red rays. To this end there is provided a suitable source such as an incandescent drying lamp which emits penetrating rays consisting mainly of infra-red rays, or a combination of infra-red and other rays, which are applied to the product to be baked.

In actual tests bread loaves were baked without enclosing the same in an oven in 20% to 30% shorter time, based on a fifty-five minute normal baking period, than is required with standard bakery ovens, and smoother top crusts were obtained. Accordingly a further object of the invention is to bake bread and other products by infra-red rays and without enclosing the same in an oven or other insulated enclosure.

Moreover it has been found that the color of the crust depended on the type of pan used, an iron pan giving a dark bottom crust and a glass pan producing a very light crust. Still another object, therefore, is to control the texture of the goods by varying the material of the tray or pan to obtain the desired crust texture.

It was also found that by varying the distance of the heat lamps from the goods the hardness of the crust, and the rate at which the crust was baked, could be regulated; and it is a further object to control the baking by varying the distance of some or all of the radiating elements.

Still another object of the invention is to control the characteristics of the baked products by varying the voltage of some or all of the drying lamps to obtain rays of various penetrative properties.

With these and other objects not specifically mentioned in view, the invention consists in certain constructions and features hereinafter fully described and specifically set forth in the appended claims.

In the accompanying drawings which form a part of this specification and in which like characters of reference indicate the same or like parts:

Figure 1:
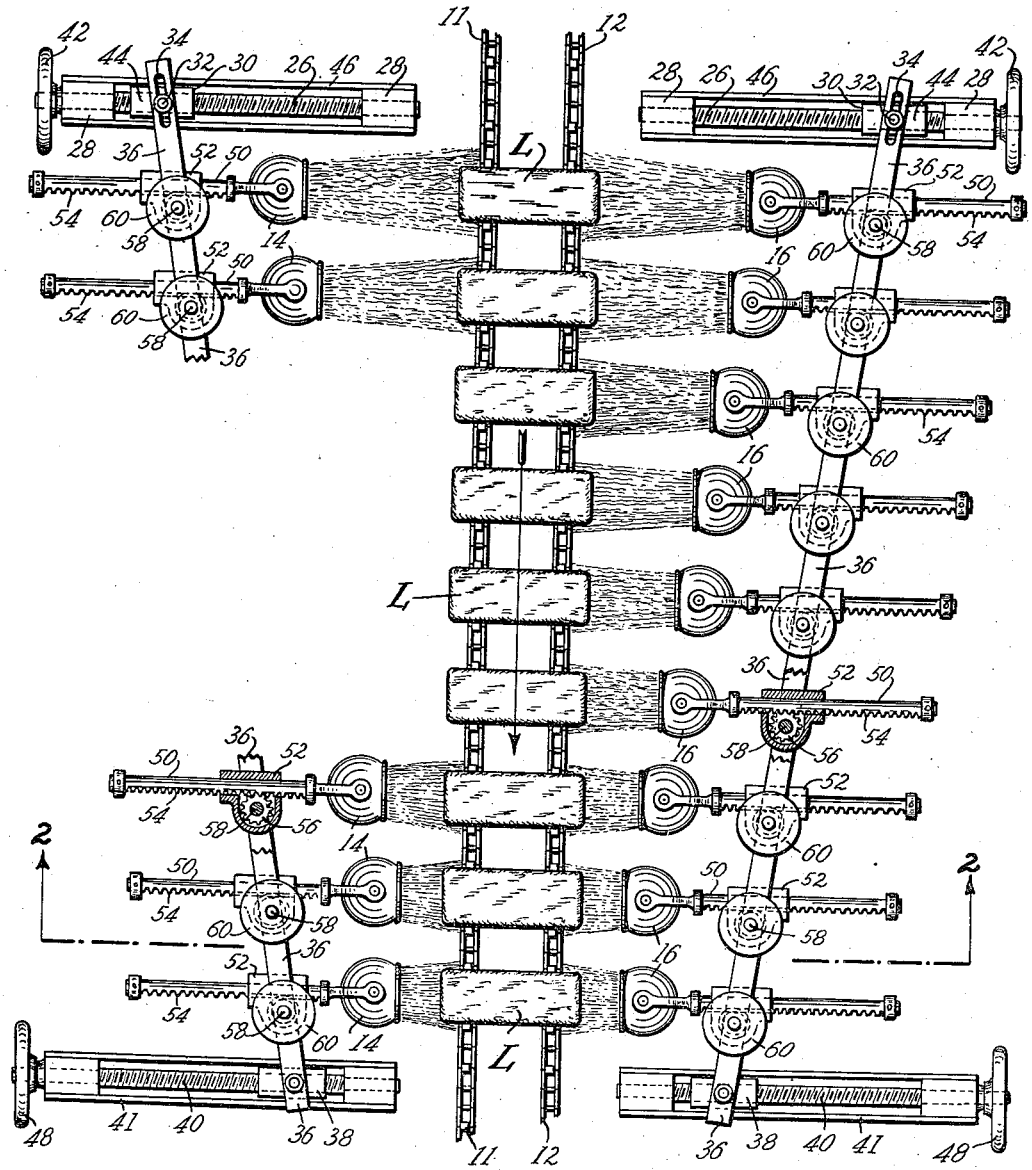
Fig. 1 is a diagrammatic plan view of apparatus for baking the goods with infra-red rays emitted from incandescent drying lamps, and provided with mechanism for regulating the distance from the goods.
Figure 2:
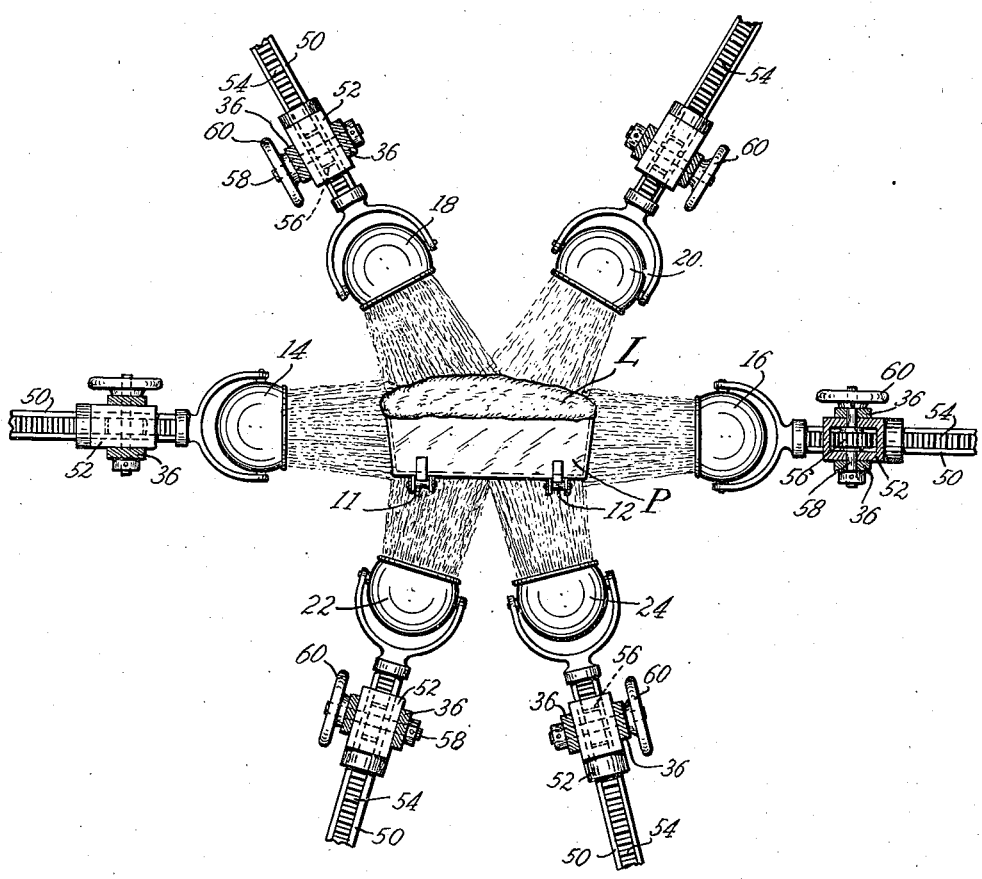
Fig. 2 is a sectional view of the same taken on the line 2—2 of Fig. 3.

Referring to Fig. 1, the loaves L, or other articles to be baked, are advanced by a conveyor 10 comprising conveyor chains 11 and 12 suitably driven by sprockets (not shown) into position to be baked by the rays emitted from the incandescent drying lamps 14 arranged at one side of the conveyor and similar lamps 16 at the other side of the conveyor. A suitable type of lamp is the Westinghouse 250 W., R-40, drying lamp having an inbuilt reflector. Banks of similar drying lamps 18 and 20 and banks of similar drying lamps 22 and 24 may also be arranged, respectively, above and below the conveyor, as shown in Fig. 2, to obtain uniform baking of the products. As the goods are advanced between the rows of lamps they are baked to the proper degree required for the particular product. These drying lamps are of well known construction and are connected to a current of 105–120 volts to heat their filaments to the temperature at which the filaments are incandescent and will emit infra-red rays or combined infra-red rays and other rays.

As shown in Fig. 1, there are provided mechanism for varying the distance of the individual lamps in each row from the goods on the conveyor. It was found that the rate at which the crust was baked was controlled by the distance from the drying lamps and by varying this distance the baking of the interior of the goods could be regulated. Each of the particular adjusting mechanisms selected for exemplification comprise a threaded spindle 26 supported in a bracket 28 adjacent the zone at which the goods enter between the heating lamps. On the spindle 26 is threaded a block 30 provided with a pin 32 disposed in the slot 34 of a bar 36 pivotally connected at its other end to a block 38 threaded on a spindle 40 which is mounted in the bracket 41 and threaded oppositely to spindle 36. Spindle 26 is provided with a hand-wheel 42, which may be turned to move the block 30 along the spindle, the block being provided with a flat face 44 engaging the inner face of one of the bars 46 of the bearing bracket 28, whereby the block is kept from turning with the spindle when the hand-wheel is turned and thereby caused to move along the spindle. Thus each of the bars 36 may be turned on its pivotal connection to the block 38. The latter is also provided with a flat face adapted to engage the bracket 41 and thereby keep the block 38 from turning when the hand-wheel 43 on spindle 40 is turned. Thus the block 38 may be moved along its spindle to effect a turning movement of the bar 36 about its connection to the block 38. Each of the lamps 14, 16, 18, 20, 22 and 24 of the various rows is supported by a rod 50 slidably mounted in one of the bearing brackets 52 fastened to the corresponding bar 36, and each rod 50 is provided with a toothed rack portion 54 meshing with a pinion 56 housed within the bearing bracket 52, the pinions 56 being supported by shaft 58 which protrude from the bearing brackets and have fastened on their protruding portions hand-wheels 60 which may be turned to effect individual adjustment of the drying lamps toward and away from the goods. Turning of either of the hand-wheels 42 or 48 of any adjusting mechanism will produce a corresponding simultaneous adjustment of all the lamps of that particular row from the loaves L in the pans P on the conveyor chains 11 and 12. The pans P may be formed of glass if a light crust is desired, or iron pans may be used if a dark bottom crust is preferred.

Figure 3:
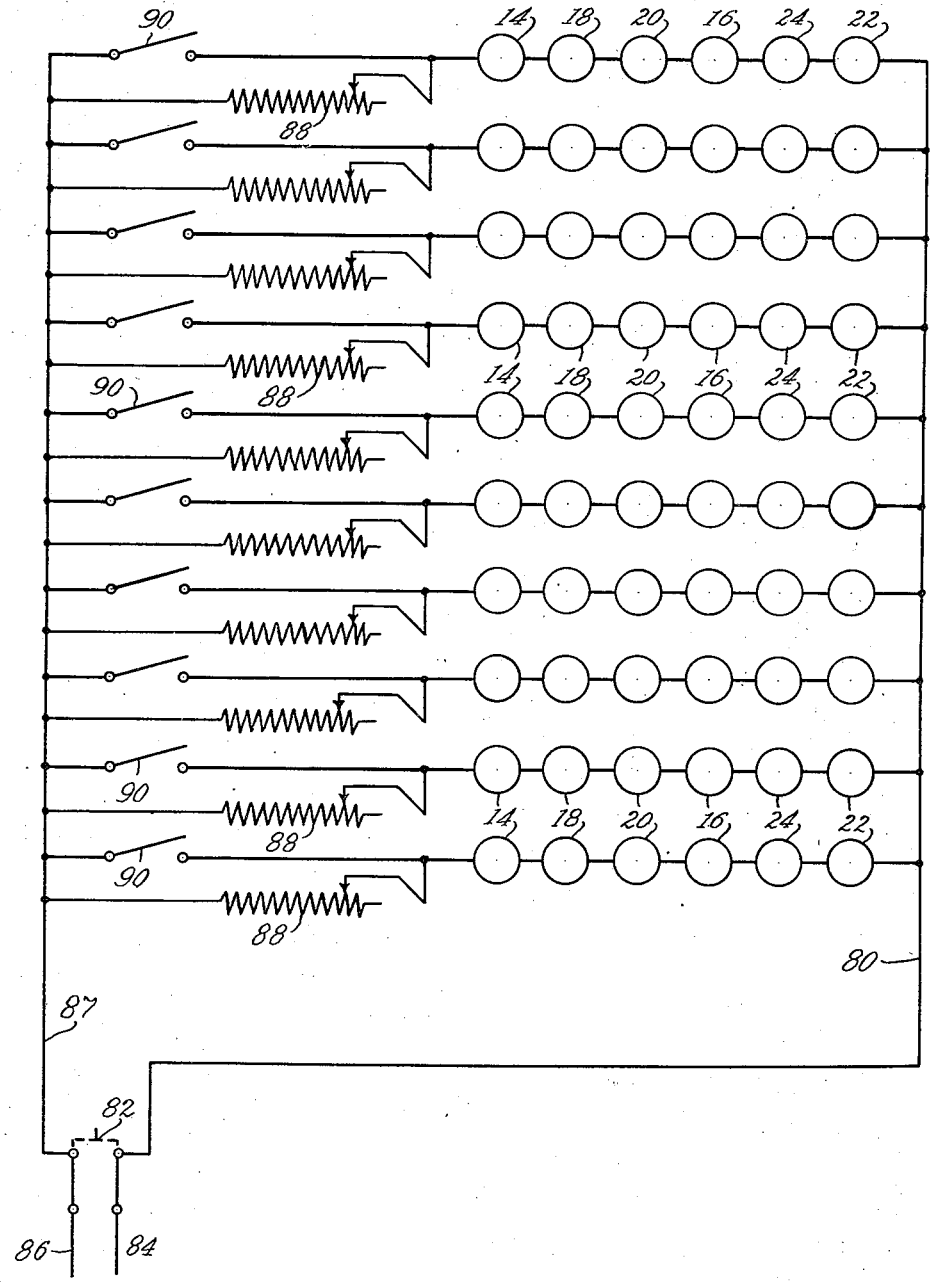
Fig. 3 is a wiring diagram of a circuit for varying the voltages applied to some or all of the heating lamps to vary the type of rays emitted and thereby controlling the characteristics of the baked goods.

A suitable wiring diagram for the various rows of lamps shown in Fig. 1 is depicted in Fig. 3, wherein the temperature of each lamp in the various rows may be individually controlled to regulate the baking operation. For this purpose the corresponding series of lamps 14, 18, 20, 16, 24, and 22 of each row are connected in series-parallel to the bus bar 80 from the switch 82 connected to the supply lines 84 and 86. The latter is connected through the switch 82 with the bus bar 87 through the variable rheostats 88 to each series of lamps. The rheostats may be regulated to vary the voltage and thus control the character of the rays emitted from each series of lamps, particularly for varying the wave length of the emitted rays. Generally speaking the lower the voltage, the longer the wave length of the emitted rays. The rheostats may be shunted by the switches 90. In this connection it will be noted that infra-red rays having a wave length near the visible portion of the spectrum are believed to have the highest penetrative properties.

For the purposes of this specification and claims, when I refer to near visible infra-red rays, I mean those infra-red rays having a wave length between the visible infra-red rays of approximately 8,000 Angstrom units in length and those of the infra-red rays of approximately 20,000 Angstrom units in length. It is well known that typical incandescent vacuum drying lamps such as the Westinghouse 250 watt R-40 have a major portion of their radiant energy in this field, as described on pages 1, 2 and 3 of "Radiant Heat and its Applications," by James D. Hall, published in the March 5, 1942, issue of the "Paper Trade Journal," and illustrated in the chart at the lower left of page 2 of this article.

Figure 4:
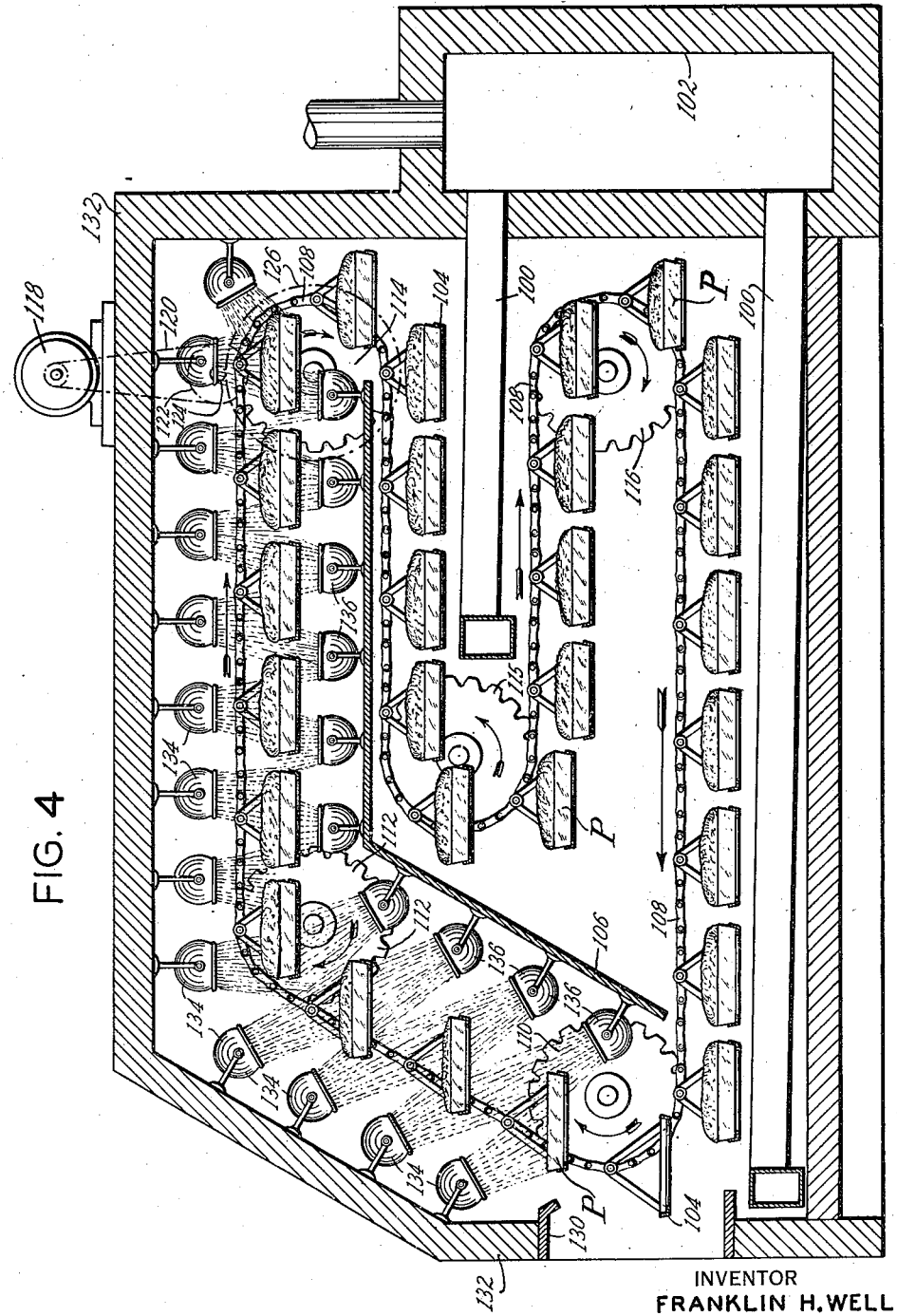
Fig. 4 is a sectional side elevation of a baking oven equipped with heating lamps arranged to emit infra-red rays upon the goods in the oven.

Referring to Fig. 4, wherein there is schematically illustrated an oven equipped with flues or pipes 100 leading from the fire box 102 into headers 104 within the baking chamber. The headers 104 are connected to suitable vents or outlets (not shown). The oven illustrated may be equipped with drying lamps similar to those described above for baking the interior of the loaves L before the crust is formed thereon, as they are advanced on the trays 104 in a circuitous path through the various heating zones provided by the baffle plate 108. The trays are mounted on a chain conveyor 108 running over sprockets 110, 112, 114, 115 and 116, the sprocket 114 being driven from a motor 118. The latter drives a belt 120 runing over a pulley 122 mounted on a shaft carrying a pinion 124 driving a gear 126 fastened on the shaft of the sprocket 114. Each tray is loaded with a pan P containing bread or other product to be baked as it approaches the loading aperture 130 in the wall 132 of the oven. The trays are then advanced upwardly under the drying lamps 134 mounted on the interior of the wall 132; and if perforated trays are used, as shown with glass bread pans, similar heating lamps 136 may be supported on the baffle plate 106, whereby the highly penetrative nature of the emitted infra-red rays will bake the interior of the loaves prior to formation of their crust. When glass pans are used, the infra-red rays from the baffle plate will pass through the perforations of the trays and penetrate through the glass pans into the bottom of the loaves and increase the rate of baking of the interior of the loaves. Moreover the use of glass pans tends to form a light crust. The rows of lamps 134 and 136 are connected to a suitable source of electricity (not shown) which maintains their filaments at the proper temperature to emit penetrating infra-red rays upon the goods on the trays.

In the baking of bread it is desirable to bake the interior of the loaf before the crust is fully formed, as otherwise the formation of the crust may prevent the proper baking of the interior. Resort has been had in prior oven constructions to various expedients for reducing the rate at which the crust is formed, so that the heat may be properly transmitted to the interior of the loaf. With the oven construction described above it will be evident that the interior of the loaves will be properly baked before they reach the final heating zones underlying the baffle plate 106 in the proximity of the flues 100 where the crust will be properly baked.

What is claimed is:

1. The method of baking a bakery product which consists in subjecting the product to infra red rays mainly in the near visible portion of the infra-red spectrum between 8,000 and 20,000 Angstrom units in wave length to penetrate into the interior of said product to bake said product without completion of the external crust, and then completing the crust by subjecting the product to baking heat substantially free from said rays to bake the exterior thereof.

2. The method of baking a bakery product which consists in subjecting said product to infra-red rays mainly in the near visible portion of the infra-red spectrum between 8,000 and 20,000 Angstrom units in wave length to penetrate to the interior of said product to bake said product.

FRANKLIN H. WELLS.